United States Patent [19]

White et al.

[11] 4,026,852

[45] * May 31, 1977

[54] HIGH TEMPERATURE POLYVINYL CHLORIDE COMPOSITIONS

[75] Inventors: Edward L. White, Freehold; Edward J. Augustyn, Yardville, both of N.J.

[73] Assignee: N L Industries, Inc., New York, N.Y.

[ * ] Notice: The portion of the term of this patent subsequent to July 16, 1993, has been disclaimed.

[22] Filed: Feb. 10, 1975

[21] Appl. No.: 548,270

[52] U.S. Cl. .......................... 260/23 XA; 260/31.6; 260/31.8 R; 260/42.44; 260/42.49; 260/45.75 R; 260/45.75 K; 260/45.85 S; 260/45.95 R

[51] Int. Cl.² .......................................... C08K 3/30

[58] Field of Search ...... 260/42.49, 31.8 R, 31.6 R, 260/42.44, 23 XA

[56] References Cited

UNITED STATES PATENTS

| | | | |
|---|---|---|---|
| 3,091,597 | 5/1963 | Henriques | 260/42.49 |
| 3,824,202 | 7/1974 | White et al. | 260/23 XA |
| 3,856,746 | 12/1974 | Susuki et al. | 260/42.49 |

*Primary Examiner*—James H. Derrington

[57] ABSTRACT

Low density alkaline earth metal sulfate fillers are used at levels below 40 phr in polyvinyl chloride thermoplastic resin formulations to improve processibility of the resin formulation and produce a thermoplastic material having retention of elongation and penetration resistance superior to known high temperature PVC thermoplastic materials.

11 Claims, No Drawings

HIGH TEMPERATURE POLYVINYL CHLORIDE COMPOSITIONS

BACKGROUND OF THE INVENTION

Thermoplastic polyvinyl chloride compounds are used extensively in the industry for producing flexible tubing, pipes, sheeting, tapes and the like and in particular as insulation on electric wires. In this latter capacity the thermoplastic compounds are frequently required to meet certain specifications of industrial groups such as automotive, communications, wire manufacturers and the like, and also certain regulatory groups such as Underwriters' Laboratories, with regard to chemical and/or physical degradation and in particular retention of tensile strength and elongation after aging at elevated temperatures plus resistance to penetration. For example, polyvinyl chloride thermoplastic compounds presently used as insulation for electric wiring have been successful in meeting Undewriters' Laboratories specifications at temperatures as high as 105° C. known commercially as 105° C. wire, this is currently the highest class of PVC thermoplastic insulation approved by U. L. However, there has been a steadily increasing demand in industry for polyvinyl chloride thermoplastic compounds that will resist chemical and/or physical degradation at temperatures above 105° C. and more especially over a much wider temperature range than has been possible using known thermoplastic compositions.

While some work has been done in this area with chlorosulfonated polyethylene thermoset materials and formulations utilizing cross-linked polyvinyl chloride, these compositions present extrusion problems when cross linking is effected during extrusion; or require post-extrusion irradiation treatment.

Of more immediate interest in U.S. Pat. No. 3,824,202 issued July 16, 1974 which discloses the preparation of a polyvinyl chloride thermoplastic composition wherein an alkaline earth metal sulfate filler is used in amount from at least 40 to as high as 90 parts per hundred parts resin the essence of the invention being the discovery that despite the high loadings of filler the PVC thermoplastic material combined good retention of elongation and tensile strength at high temperatures with good penetration resistance. However, these relatively high loadings of filler require high shear conditions during extrusion, i.e., screw compression ratios as high as 3:1 in order to effectively fuse and form extrudates with satisfactory physicals. Also of the alkaline earth metal sulfate fillers mentioned,, barium sulfate, in particular is expensive and its relatively high density gives rise to processing difficulties accompanied by loss of gloss and contour.

SUMMARY OF INVENTION

The present invention relates to an improved thermoplastic high temperature polyvinyl chloride resin composition and process for making same, said thermoplastic resin composition having superior properties to those of the resin composition described in the aforesaid U.S. Pat. No. 3,824,202; and characterized by the addition of low density fillers, i.e. fillers having densities less than 3.0 in amounts less than 40 to as low as 15 parts per hundred parts resin and preferably from 20 to 25 parts per hundred parts resin the invention having its conception in the unexpected discovery that of the alkaline earth metal sulfate fillers used heretofore in PVC thermoplastics calcium sulfate and magnesium sulfate, having densities of 2.96 and 2.66, respectively are unique in that when incorporated in thermoplastic PVC resin formulations in amounts significantly less than amounts used heretofore the processability of the PVC resin formulation is significantly improved as measured by higher output rates, superior fusion, and lower energy requirements. Moreover certain physicals of the PVC thermoplastic composition and in particular retention of elongation and penetration resistance after aging at elevated temperatues have been found, quite unexpectedly, to be superior to those of known high temperature PVC resin compositions.

In particular it has been found that when these lesser amounts of a low density alkaline earth metal sulfate filler are used processing of the polyvinyl chloride resin formulation is significantly improved, that is to say, extrusions can be effected at relatively high rates; fusion, as measured by surface contour and gloss, are improved; while energy requirements, as measured by mixing torque and die pressures, are relatively low. Moreover, because of the relatively low densities of the fillers of this invention lower weight loadings, i.e., phr, may be used to obtain volume loadings equal to those of other alkaline earth metal sulfate fillers. In this connection the superiority of the product and process of the instant invention are especially evident when compared on basis of equal volume concentration to high temperature PVC compositions of the prior art.

As a consequence of these discoveries it is now possible to produce flexible high temperature polyvinly chloride thermoplastic materials amenable to processing at relatively low compression ratios, with minimum malfunctioning and superior fusion; and to produce a product having optimum physicals i.e., elongation and tensile strength after aging at elevated temperatures together with superior penetration resistance such that these thermoplastic materials not only meet the specifications of many industrial groups but surpass, for example, the U. L. specification for 105° C, wire insulation.

PREFERRED EMBODIMENT OF INVENTION

The components used in the preparation of the thermoplastic PVC resin composition of this invention include a stabilizer, low density alkaline earth metal sulfate filler, one or more anti-oxidants, one or more plasticizers and a high molecular weight resin.

The stabilizer used is selected to retard polyvinly chloride dehydrochlorination and oxidation during high temperature processing and may be a normal or basic lead stabilizer, hereinafter referred to as lead-base stabilizers. As used herein this term will be understood to include lead compounds such as basic lead silicate, $3PbO.2SiO_2.2H_2O$; tribasic lead sulfate, $3PbO, PbSO_4.H_2O$; basic lead chlorosilicate (a complex containing about 47% $SiO_2$ and 3% Cl); normal lead stearate Pb $(C_{17}H_{35}COO)_2$; dibasic lead stearate $2PbO.Pb(C_{17}H_{35}COO)_2$; a lead-barium complex known commercially as Mark 550 and sold by Argus Chemical Company; and modifications thereof such as for example a dibasic lead phthalate, a tribasic lead sulfate or a basic lead chlorosilicate having a coating comprising a barium salt of a fatty acid i.e. barium stearate as described in U.S. Pat. Nos. 3,106,539 and 2,847,145 respectively.

While the lead compounds enumerated above are acceptable stabilizers for many applications the modified stabilizers referred to above, i.e., the dibasic lead phthalate, tribasic lead sulfate and the basic lead chlorosilicate all coated with a barium stearate are the preferred stabilizers for use in forming the improved PVC thermoplastic compound of this invention. In particular the modified basic lead chlorosilicate complex, hereinafter identified for brevity as MPC-S, is especially suitable being highly effective when added at a level of 5–15 parts per 100 parts resin in plasticizer systems that are reactive or nonreactive with high basicity compounds. The modified tribasic lead sulfate i.e. MPS, is preferred at similar levels for less reactive plasticizer systems while the modified dibasic lead phthalate (MDPT) is preferred for plasticizer systems of intermediate reactivity.

In addition to the lead-base stabilizers certain non-lead stabilizers have been used successfully in the preparation of the flexible PVC thermoplastic compound of this invention; in particular, organo-tin-compounds such as dibutyl tin-bis-isooctyl thioglycolate and certain barium-cadmium complexes such as Mark OHM, manufacture by Argus Chemical Company. Of these non-lead stabilizers the organo-tin compounds are usually added at levels of from 2–5 parts per 100 parts resin and the barium-cadmium compounds at levels of from 5 to 10 parts per 100 parts resin.

To insure the superior physicals desired in the thermoplastic composition of this invention it is essential that the PVC resin used be of relatively high molecular weight that is to say having an inherent viscosity of at least 1.1; and that it be used in combination with plasticizers of low volatility that is to say having vapor pressures at least as low as 0.20 dynes per sq. centimeter at 160° C.

With reference again to the low density alkaline earth metal sulfate fillers used in the preparation of the thermoplastic PVC resin composition of this invention the function of a filler is to fill the PVC matrix so as to provide satisfactory resistance to load deformation and penetration (in the case of wire insulation) without reducing the retention of elongation and tensile strength, after aging, below acceptable limits. Many different kinds of fillers such as for example talc, calcium carbonate, coated clays and the like have been used heretofore for imparting these properties to PVC thermoplastic compounds designed for moderately high temperature (105° C) use. However, it was found that, if used in amounts sufficient to insure satisfactory resistance to load defomation and penetration at elevated tempertures, i.e., temperatures above 105° C., these conventional fillers lowered the percent retention of elongation after aging below acceptable levels. Also, heavy alkaline earth metal sulfate fillers have been used heretofore but at relatively high loadings as a consequence of which processing the composition has been difficult and costly.

An additional component to be included with the stabilizers and low density alkaline earth metal sulfate fillers of this invention is an anti-oxidant which serves to minimize plasticizer and polyvinyl chloride resin oxidation during high temperature processing and subsequent aging; and in this capacity may also be considered a stabilizer. In general phenolic-type anti-oxidants are used in the stabilization of vinyl chloride compounds one of the more commonly used anti-oxidants, because of its relatively low cost, being 2,2'-bis (4-hydroxy phenyl) propane (BPA). This may be used either alone or in combination with other anti-oxidants such as di-esters of thio-dipropionic acid and in particular dilaurylthiodipropionate (DLTDP). When used alone the (BPA) may be used in amounts of from 0.5 to 2 parts per 100 parts resin; and the (DLTDP) in amounts from 0.5 to 2.0 phr. When used in combination the range is from 0.5 to 4 parts per 100 parts resin, the preferred ration being 2 parts (BPA) to 1 part (DLTDP).

The stabilizer, filler and anit-oxidant may be mixed together in predetermined amounts, as for example by dry blending, to form a homogeneous mixture, sometimes referred to as a stabilizer-filler additive, which may be packaged and sold to plastic manufacturers for producing the high temperature, flexible, thermoplastic polyvinyl chloride materials of this invention.

As mentioned above the plasticizers used are those characterized by low volatility as measured by vapor pressures at elevated temperatures; and in this connection plasticizers suitable for use in the thermoplastic PVC formulations of this invention are included by reference to the above identified U.S. Pat. No. 3,824,202.

The low volatility plasticizers used are those having a vapor pressure no higher than about 0.2 dynes/cm.$^2$ and include, for example, mixed normal alkyl trimellitate (NTM) manufactured by Hooker Chemical Company, a dipentaerythritol ester (PE) known as Hercoflex 707 and manufactured by Hercules Chemical Company; a medium molecular weight polyester (MMPP) known as Santicizer 409 and manufactured by Monsanto Chemical Company; a high molecular weight polyester (HMP) known as Emery 9789 and manufactured by Emery Industries and a high molecular weight polysebacate (HMPs) known as Paraplex G-25 and sold by Rohm and Haas Company. Formulation levels of from 40 to 60 afd preferably about 50 parts per 100 parts resin have been found to be most effective in developing retention of elongation after aging of about 50% coupled with resistance to deformation or penetration under load.

The high temperature polyvinyl chloride thermoplastic compounds of this invention are preferably those that embody a stabilizer-filler additive comprising a stabilizer selected from the groups consisting of lead-base stabilizers, organo-tin compounds and certain lead-barium and barium-cadmium complexes in combination with a calcium sulfate or magnesium sulfate filler, and an anti-oxidant such as 2-2'-bis (4 hydroxy phenyl) propane either along or in combination with dilaurylthiodipropionate. A typical stabilizer-filler additive is given below:

Stabilizer: modified lead chlorosilicate 4.4 to 45.5%
Filler: low density alkaline earth metal sulfate 45.5 to 88.9%
Anti-oxidants:
 2,2'-bis (4 hydroxy phenyl) propane
 Dilaurylthiodipropionate  5.17 to 15.0%

Modifications of the above composition may include substitution of a modified tribasic lead sulfate or a dibasic lead phthalate for the modified lead chlorosilicate, and in substantially the same amounts.

The several components of these stabilizer-filler additives may be mixed together in any suitable manner as for example by dry blending. Optionally the individual components, i.e., the stabilizer, filler and anti-oxidants may be added separately. Moreover, other components such as lubricants and the like may be added at any convenient point in the production of the thermoplastic compound.

There is, of course, no universal stabilizer for PVC plastics and different lead-base stabilizers offer particular advantages when combined with different plasticizers. Hence, the formulation of a polyvinyl chloride thermoplastic composition having certain desirable properties is an empirical art. Thus, for example, retention of elongation after aging is dependent upon the aging characteristics (thermal stability) of the resin, the thermal stability characteristics of the plasticizer used, the efficiency of the stabilizer and the stabilizer-plasticizer interaction; while penetration resistance depends upon thermal deformation characteristics of the resin, and the level and type of plasticizer and filler used. In general high filler loadings improve resistance to penetration but are attended by loss in retention of elongation after aging at elevated temperatures, while low filler loadings, for the sake of retention of elongation, result in loss of penetration resistance.

Now however it has been discovered that the requirements for penetration resistance together with retention of elongation and tensile strength after aging at elevated temperatures can be met using unexpectedly low levels of a calcium sulfate or magnesium sulfate filler.

The preparation of the polyvinyl chloride thermoplastic material of this invention may be carried out by a relatively simple physical blending procedure wherein the polyvinyl chloride homopolymer resin is charged into suitable dry blending equipment, such as for example a Henschel blender, heated to about 130° F. and followed by rapid addition of the selected plasticizer. The temperature of the mixture is brought to about 190° F. for about 1 minute whereupon the components of the stabilizer-filler additive thermoplastic above plus antimony trioxide and stearic acid are added to the mix. After about 1.5 minutes or when the temperature of the mixture reaches about 230° F. the mixture is discharged from the blender. When used as feed material for extruding wire insulation this dry blend is milled at 365° F for 7 minutes, ground in a Cumberland grinder and then extruded using a Brabender extruder equipped with a 3:1 single stage compression ratio screw to form PVC coated wire.

With reference to the aforesaid physicals, these are those physical properties of a thermoplastic material i.e. its retention of tensile strength and elongation; and its resistance to penetration for which it is most frequently tested in determining its acceptability by the standards of various industrial groups or by a regulatory group such as Undewriters' Laboratories. Among other things, the latter groups provides tests for thermoplastic wire insulation at elevated temperatures.

The tests used in determining the physicals of the PVC thermoplastics compounds of this invention were modifications of U. L.'s 105° C. tests in that the test specimens used were 1/32 inch wire insulation extruded over a No. 20 AWG solid copper conductor; which were tested for retention of tensile strength and elongation after being air oven aged for 7 days at 158° C. A 70% retention of tensile strength and 50% retention of elongation were adopted as minimum values for an acceptable high temperature insulation. The penetration resistance of the specimens was determined at both 125° and 132° C. using Underwriter's Laboratories test which requires no cut-through after 10 minutes in three out of three attempts. The higher test temperature was included to insure that differences in penetration resistance could be observed between wire insulation. Further details of the foregoing tests are incorporated by reference to aforesaid U.S. Pat. No. 3,824,202.

The invention is further illustrated by the following examples.

EXAMPLES I – XIII

A series of runs were made employing seven experimental PVC thermoplastic compounds prepared as hereinabove described, each compound comprising 100 parts high molecular weight PVC, i.e., a resin having an intrinsic viscosity of about $1.3^+$; 50 parts low volatility plasticizer that is to say having a vaor pressure no higher than about 0.2 dynes/cm$^2$ at 160° C; 10 parts lead chlorosilicate stabilizer; 3 parts antioxidant consisting of 2 parts BPA (2,2'-bis (4-hydroxy phenyl) propane and 1 part DLTDP (dilaurylthiodipropionate), 3 parts anitmony oxide (flame retardant), 0.1 parts stearic acid and a filler (variable). The variables were the type and level of filler and include: BaSO$_4$ filler at 67 and 37.5 phr; anhydrous CaSo$_4$ filler at 25, 20, 15 and 10 phr; and MgSO$_4$.7H$_2$O at 23 phr. The BaSO$_4$ at 37.5 phr, anhydrous CaSO$_4$ at 25 phr, and MgSo$_4$.7H$_2$O at 23 phr represented equal volume loadings of filler. Extrusion conditions were also examined. A constant temperature profile in four zones of: 185°, 190°, 195° and 190° C respectively were used and the screw speed was varied from 50, 75 and 100 rpm to determine processability and output rates in extruding 1/32 inch insulations on No. 20 AWG solid copper conductor.

The extruded wire insulations were then evaluated according to standard U. L. specifications to determine their relative performance in terms of retentions of elongation and tensile strength after being air oven aged for seven days at 158° C, and original penetration resistance at both 125° and 132° C.

The results of these several runs are reported in Table I.

TABLE I

PROCESSING AND PLASTIC PERFORMANCE OF PVC THERMOPLASTIC RESIN WIRE INSULATION EMPLOYING FILLERS OF DIFFERENT DENSITIES

| Filler Variables (PHR) | | | | | | | | | | | | | |
|---|---|---|---|---|---|---|---|---|---|---|---|---|---|
| BaSO$_4$ ⟶ | 67 | 37.5 | | | | | | | | | | | |
| Anhydrous CaSO$_4$ ⟶ | | | 25 | 20 | 15 | 10 | | | | | | | |
| MgSO$_4$ . 7H$_2$O ⟶ | | | | | | | | | | | | 23 | |
| | I | II | III | IV | V | VI | VII | VIII | IX | X | XI | XII | XIII |

Extrusion Properties (Zone 1=85° C; Zone 2=190° C; Zone 3=195° C; Zone 4=190° C) - 3/4"Barrel, L/D= 25/1, Single Stage Screw (Compression Ratio=3/1)

| | | | | | | | | | | | | | |
|---|---|---|---|---|---|---|---|---|---|---|---|---|---|
| Screw Speed, RPM | 50 | 50 | 50 | 75 | 100 | 50 | 75 | 50 | 75 | 50 | 75 | 50 | 75 |
| Take Up Speed | 34 | 39 | 39 | 60 | 85 | 34 | 45 | 34 | 52 | 32 | 54 | 42 | 60 |

TABLE I-continued

PROCESSING AND PLASTIC PERFORMANCE OF PVC THERMOPLASTIC RESIN WIRE INSULATION EMPLOYING FILLERS OF DIFFERENT DENSITIES

Filler Variables (PHR)

| | I | II | III | IV | V | VI | VII | VIII | IX | X | XI | XII | XIII |
|---|---|---|---|---|---|---|---|---|---|---|---|---|---|
| $BaSO_4$ | 67 | 37.5 →| | | | | | | | | | | |
| Anhydrous $CaSO_4$ | | → | 25 | | 20 | | 15 | | 10 | | | | |
| $MgSO_4 \cdot 7H_2O$ | | | | → | | | | | | | | | 23 |

| | I | II | III | IV | V | VI | VII | VIII | IX | X | XI | XII | XIII |
|---|---|---|---|---|---|---|---|---|---|---|---|---|---|
| Setting | | | | | | | | | | | | | |
| Torque, M-gms | 5400 | 4800 | 4800 | 4800 | 5200 | 4600 | 5000 | 4600 | 4800 | 4500 | 4800 | 4800 | 4900 |
| Die Pressure, PSI | 2000 | 1850 | 1750 | 1800 | 1850 | 1700 | 1800 | 1650 | 1700 | 1650 | 1650 | (1) | (1) |
| Stock Temp., °C | 196 | 195 | 195 | 197 | 196 | 194 | 195 | 195 | 195 | 195 | 195 | 195 | 195 |
| Rate, Ft/Hour | 1410 | 1464 | 1578 | 1262 | 2946 | 1338 | 1854 | 1404 | 2028 | 1446 | 2208 | 1608 | 2250 |
| Gloss | Fair | Fair+ | Good | Good | Good | Good | Good | Good | Good | Good | Good | Good | Good |
| Porosity | None | None | None | None | None | None | None | None | None | None | None | None | None |
| Fusion | Good | Good+ | Good+ | Good+ | Good+ | Good+ | Good+ | Good+ | Good+ | Good+ | Good+ | Good+ | Good+ |
| Contour | V Sl. Rough | Smooth− | Smooth | Smooth | Smooth | Smooth | Smooth | Smooth | Smooth | Smooth | Smooth | Smooth | Smooth |

Original Versus 7 Day — 158° C Turn Table Oven Aged 1/32 Inch Wire Insulation - Physical Properties

| | I | II | III | IV | V | VI | VII | VIII | IX | X | XI | XII | XIII |
|---|---|---|---|---|---|---|---|---|---|---|---|---|---|
| Tensile Strength, PSI-Orig. | 2327 | 2128 | 2520 | 2608 | 2773 | 2443 | 2586 | 2500 | 2667 | 2445 | 2728 | 2645 | 2462 |
| % Retention | 122 | 134 | 120 | 118 | 116 | 120 | 122 | 116 | 114 | 116 | 121 | 107 | 122 |
| Elongation, %-orig. | 173 | 165 | 219 | 252 | 225 | 201 | 230 | 209 | 246 | 215 | 248 | 223 | 231 |
| % Retention | 77 | 90 | 71 | 81 | 88 | 73 | 81 | 78 | 89 | 75 | 88 | 68 | 85 |
| Plasticizer Loss, % | 17.9 | 17.5 | 17.7 | 17.4 | 17.4 | 17.7 | 17.2 | 17.2 | 17.1 | 17.3 | 17.2 | 22.7 | 22.6 |
| Modulus at 100% Elong., PSI-Orig. | 2128 | 2058 | 2058 | 1988 | 2196 | 2154 | 2168 | 2136 | 2033 | 2080 | 2150 | 2157 | 2053 |
| Ibid-Aged | 2753 | 2650 | 2738 | 2642 | 2848 | 2777 | 2861 | 2620 | 2557 | 2602 | 2780 | 2643 | 2592 |

Penetration Resistance, Minutes To Failure, Blue M Vibration Free Oven — 350 GM Force

| 125° C | I | II | III | IV | V | VI | VII | VIII | IX | X | XI | XII | XIII |
|---|---|---|---|---|---|---|---|---|---|---|---|---|---|
| Trial 1 | >12 | >12 | >12 | >12 | >12 | >12 | >12 | >12 | >12 | 7.1 | >12 | >12 | >12 |
| Trial 2 | >12 | >12 | >12 | >12 | >12 | >12 | >12 | >12 | >12 | 7.3 | 7.7 | >12 | >12 |
| Trial 3 | >12 | >12 | >12 | >12 | >12 | >12 | >12 | >12 | >12 | >12 | >12 | >12 | >12 |
| Average 3 Trials | >12 | >12 | >12 | >12 | >12 | >12 | >12 | >12 | >12 | 8.8 | 10.6 | >12 | >12 |

| 132° C | I | II | III | IV | V | VI | VII | VIII | IX | X | XI | XII | XIII |
|---|---|---|---|---|---|---|---|---|---|---|---|---|---|
| Trial 1 | 8.0 | 2.4 | >12 | — | — | >12 | — | 9.0 | — | 0.5 | — | 3.8 | — |
| Trial 2 | 6.3 | 3.2 | 6.8 | — | — | 5.2 | — | 4.2 | — | 0.7 | — | 8.0 | — |
| Trial 3 | 6.9 | 2.9 | 5.8 | — | — | 6.7 | — | 2.0 | — | 3.5 | — | 4.0 | — |
| Average 3 Trials | 7.1 | 2.8 | 8.2 | — | — | 8.0 | — | 5.1 | — | 1.6 | — | 5.3 | — |

(1) - Die pressure indicator clogged, no reading taken.

The data itemized in Table I show that $CaSO_4$ filler at a relatively low level i.e. 20–25 phr will produce a PVC wire insulation which is clearly superior to an insulation prepared using 67 phr $BaSO_4$ filler both in processability during extrusion and penetration resistance; that, in general PVC compounds utilizing anhydrous $CaSO_4$ filler developed higher output rates and superior surface contour and gloss during extrusion. Moreover, lower mixing torques and die pressures were required showing that $CaSO_4$ filler renders the formulations capable of easier mixing and flux by reducing the melt viscosity during extrusion. Further, the performance of 20–25 phr $CaSO_4$ filler in PVC wire coatings in terms of unaged tensile strength and elongation properties is seen to be significantly superior to PVC coatings using 67 phr $BaSO_4$ filler.

Also, when tested at equal volume loadings the lower density alkaline earth sulfates i.e. $CaSO_4$ (25 phr) and $MgSO_4.7H_2O$ (23 phr) were found to be superior in terms of processability, fusion and penetration resistance to PVC wire coatings using $BaSO_4$ filler (37.5 phr). It will be noted that the PVC wire coatings prepared with $BaSO_4$ filler at 37.5 phr had somewhat better retention of elongation when run at a relatively low speed of 50 rpm. However this advantage disappeared at higher extrusion speeds. Thus extrusions of formulations containing anhydrous $CaSO_4$ filler at 25 phr at speeds of 100 rpm resulted in wire insulation with equivalent retention of elongation and superior unaged tensile strength and elongation—as well as providing higher output rates.

It is also evident from the data that the $MgSO_4.7H_2O$ filler provides PVC wire coatings having advantages over $BaSO_4$ filler in terms of processing, fusion and penetration resistance.

The data further establishes that the optimum combination of penetration resistance and retention of elongation occurs at a $CaSO_4$ filler level of 20–25 phr; and that 15 phr is the minimum level for significant improvement over $BaSO_4$ filler. In this connection it is apparent that the use of anhydrous $CaSO_4$ filler at 15 phr level provides substantially the same penetration resistance as a $BaSO_4$ filler at 37.5 phr—an extreme which cannot be accounted for by the difference in specific gravity.

As further evidence of the uniqueness of $CaSO_4$ as a filler in thermoplastic PVC compounds is its superior performance in terms of penetration resistance and retention of elongation compared to the performance of other representative commercial fillers of comparable density such as for example No. 33 clay, (a calcined aluminum silicate), magnesium silicate and coated and uncoated calcium carbonate fillers.

All the above fillers were evaluated at 20 and 30 phr in the PVC compound hereinabove identified. The results are tabulated in Table II below (Examples XIV through XXV).

TABLE II

COMPARISON OF COMMERCIAL FILLERS vs ANHYDROUS CaSO₄ FILLER ON PHYSICAL AND PENETRATION PROPERTIES OF PVC THERMOPLASTIC COMPOUNDS

| | XIV | XV | XVI | XVII | XVIII | XIX | XX | XXI | XXII | XXIII | XXIV | XXV |
|---|---|---|---|---|---|---|---|---|---|---|---|---|
| Filler (PHR) | | | | | | | | | | | | |
| (Barium Sulfate) | 30 | — | — | — | — | — | 20 | — | — | — | — | — |
| Anhydrous CaSO₄ | — | 30 | — | — | — | — | — | 20 | — | — | — | — |
| No. 33 Clay (Aluminum Silicate) | — | — | 30 | — | — | — | — | — | 20 | — | — | — |
| Mistron Vapor Talc (Magnesium Silicate) | — | — | — | 30 | — | — | — | — | — | 20 | — | — |
| Chemcarb 11 (Calcium Carbonate) | — | — | — | — | 30 | — | — | — | — | — | 20 | — |
| Winnafil S (Calcium Carbonate) | — | — | — | — | — | 30 | — | — | — | — | — | 20 |
| Plastolein 9789 (Hi-Molecular wt polyester) | 50 | 50 | 50 | 50 | 50 | 50 | 50 | 50 | 50 | 50 | 50 | 50 |
| Physical Properties - Original Versus 7 Day - 158° C Air Oven Aged 20 Mil Slab Specimens | | | | | | | | | | | | |
| Tensile Strength, PSI - Original | 3025 | 3237 | 3048 | 3357 | 3323 | 3360 | 3420 | 3373 | 3178 | 3340 | 3565 | 3600 |
| % Retention | 84 | 78 | 99 | 99 | 75 | 0⁽¹⁾ | 74 | 78 | 91 | 100 | 75 | 10 |
| Elongation, % - Original | 295 | 258 | 258 | 210 | 222 | 220 | 310 | 288 | 267 | 250 | 277 | 265 |
| % Retention | 74 | 72 | 34 | 40 | 23 | 0⁽¹⁾ | 81 | 78 | 42 | 51 | 39 | <4 |
| Plasticizer Loss, % | 26.4 | 22.9 | 21.6 | 19.4 | 35.2 | 70.2 | 24.5 | 23.6 | 28.9 | 20.7 | 27.0 | 73.3 |
| Penetration Resistance - 350 Gram Force - Vibration Free Oven (Minutes To Cut - Through) | | | | | | | | | | | | |
| 132° C | | | | | | | | | | | | |
| Trial 1 | 3.7 | >12 | 8.7 | 5.1 | 6.5 | >12 | 2.2 | 6.0 | 5.3 | 2.6 | 2.3 | 1.9 |
| Trial 2 | 4.0 | >12 | 9.1 | 6.0 | >12 | >12 | 4.0 | 6.3 | 3.9 | 5.4 | 5.5 | 5.0 |
| Trial 3 | 5.3 | 8.6 | >12 | >12 | 6.1 | 9.9 | 2.7 | 3.2 | 3.3 | 3.2 | 6.8 | 8.0 |
| Average 3 Trials | 4.3 | 10.9 | 9.9 | 7.7 | 8.2 | 11.3 | 3.0 | 5.1 | 4.2 | 3.7 | 4.9 | 5.0 |

⁽¹⁾Specimens very brittle, cracked in tensile tester jaws.

From the above data it will be seen that the anhydrous CaSO₄ filler provides the best overall balance of retention of physicals plus penetration resistance as compared to the higher density barium sulfate or the representative commercial fillers of comparable density. Thus the lower density CaSO₄ is seen to be distinctly superior to BaSO₄ with respect to penetration resistance; and clearly superior to any one of the commercial fillers in terms of retention of elongation.

While the examples used herein to illustrate the invention employ one thermoplastic formulation the scope of the invention includes, by reference the variables described in Tables II and V of U.S. Pat. No. 3,824,207 with the exception of the filler which according to the present invention is anhydrous calcium sulfate or magnesium sulfate in amounts less than 40 parts per hundred parts resin to as low as 15 phr, the performance of the resulting PVC thermoplastic compositions being in every respect comparable to the performance of the PVC thermoplastic compositions illustrated by the foregoing examples.

While the invention has been described and illustrated by the examples included herein it is not intended that the invention be strictly limited thereto and other variations and modifications may be employed within the scope of the appended claims.

We claim:

1. In a high temperature polyvinyl chloride thermoplastic composition characterized by resistance to penetration plus retention of elongation and tensile strength at temperatures at least as high as 125° C. wherein a stabilizer-filler additive is combined with a polyvinyl chloride resin having an inherent viscosity of at least 1.1, a low volatile plasticizer in amounts from 20 to 60 parts, said plasticizer having a vapor pressure at least as low as about 0.2 dynes/cm² at 160° C., and an antioxidant selected from the group consisting of 2,2'-bis(4-hydroxy phenyl)propane, dilaurylthiodipropionate and mixtures thereof the improvement comprising: a stabilizer-filler additive wherein the stabilizer is selected from the group consisting of normal and basic lead compounds, organo-tin compounds, lead-barium compounds and barium-cadmium compounds said filler comprising an alkaline earth metal sulfate having a specific gravity less than 3.0 and added in amounts less than 40 to as low as 15 parts, all parts based on 100 parts resin.

2. In a high temperature polyvinyl chloride thermoplastic composition according to claim 1 wherein said filler is CaSO₄.

3. In a high temperature polyvinyl chloride thermoplastic composition according to claim 1 wherein said filler is magnesium sulfate.

4. In a high temperature polyvinyl chloride thermoplastic composition according to claim 1 wherein te stabilizer of said stabilizer-filler is barium stearate coated lead chlorosilicate.

5. In a high temperature polyvinyl chloride thermoplastic composition according to claim 1 wherein the stabilizer of said stabilizer-filler additive is barium stearate coated tribasic lead sulfate.

6. In a high temperature polyvinyl chloride thermoplastic composition according to claim 1 wherein the stabilizer of said stabilizer-filler additive is barium stearate coated dibasic lead phthalate.

7. In a high temperature polyvinyl chloride thermoplastic composition according to claim 1 wherein the stabilizer of sad stabilizer-filler additive is a barium-cadmium complex.

8. In a high temperature polyvinyl chloride thermoplastic composition according to claim 1 wherein said stabilizer of said stabilizer-filler additive is a lead-barium complex.

9. In a high temperature polyvinyl chloride thermoplastic composition according to claim 1 wherein said stabilizer of said stabilizer-filler additive is dibutyl tin bis isooctyl thioglycolate.

10. In a high temperature polyvinyl chloride thermoplastic composition according to claim 1 wherein said plasticizer comprises a mixed normal alklytrimellitate in an amount of about 40–60 phr, said stabilizer comprises barium stearate coated basic lead chlorosilicate in an amount of about 2–15 phr, said filler comprises calcium sulfate in amount from 15 to 25 phr and said anti-oxidant comprises te combination of 2,2¹-bis (4-hydroxy phenyl) propane and dilaurylthiodipropionate in the ratio of 2:1 all of said parts based on 100 parts resin.

11. A high temperature polyvinyl chloride thermoplastic composition according to claim 10 wherein said plasticizer comprises a dipentaerythritol ester in an amount of about 40–60 phr.

* * * * *